US005737004A

United States Patent [19]

Rodi

[11] Patent Number: 5,737,004

[45] Date of Patent: Apr. 7, 1998

[54] PROCESS AND DEVICE FOR DEVELOPING AN ELECTROSTATIC LATENT IMAGE

[75] Inventor: Anton Rodi, Leimen, Germany

[73] Assignee: Heidelberger Druckmaschinen AG, Heidelberg, Germany

[21] Appl. No.: 763,905

[22] Filed: Dec. 11, 1996

[30] Foreign Application Priority Data

Dec. 12, 1995 [DE] Germany ........................ 195 46 248.3

[51] Int. Cl.$^6$ ........................ G01D 15/06

[52] U.S. Cl. ........................ 347/151; 347/115; 358/300; 399/298; 101/DIG. 37

[58] Field of Search ........................ 358/300; 347/112, 347/115, 151; 399/298, 308, 310; 430/31, 125; 101/DIG. 37; 118/621, 625; 427/458

[56] References Cited

U.S. PATENT DOCUMENTS

| | | | |
|---|---|---|---|
| 3,997,688 | 12/1976 | Gundlach et al. . | |
| 4,777,500 | 10/1988 | Salmon | 346/160.1 |
| 4,792,860 | 12/1988 | Kuehrle . | |
| 5,314,774 | 5/1994 | Camis | 430/47 |
| 5,581,290 | 12/1996 | Kuehnle | 347/115 |
| 5,602,578 | 2/1997 | Sumiyoshi et al. | 347/232 |
| 5,889,867 | 12/1996 | Yamaguchi | 347/151 X |

*Primary Examiner*—R. L. Moses
*Attorney, Agent, or Firm*—Herbert L. Lerner; Laurence A. Greenberg

[57] ABSTRACT

A method of developing an electrostatic latent image produced on a surface of a movable intermediate carrier by electrically-charged dielectric color particles which are transported through a gap between the surface of the intermediate carrier and a surface of a developing device includes loosely filling most of the gap with color particles, and successively producing, along the transport path of the color particles through the gap, the following voltage differences between the surface of the developing device and non-image regions on the surface of the intermediate carrier: a first voltage difference substantially equal to zero, so that the color particles are not electrostatically attracted or repelled, in substance, by the surface of the developing device and by the non-image regions, respectively; a second voltage difference providing an electric field between the surface of the developing device and the non-image regions, the color particles in the non-image regions being completely separated from the surface of the intermediate carrier by the electric field; and a third voltage difference smaller than the second voltage difference and providing an electric field between the surface of the developing device and the non-image regions, the color particles situated opposite the surface of the intermediate carrier in the non-image regions remaining spaced from the latter surface; and a device for performing the method.

17 Claims, 2 Drawing Sheets

PROCESS AND DEVICE FOR DEVELOPING AN ELECTROSTATIC LATENT IMAGE

BACKGROUND OF THE INVENTION

1. Field of the Invention

The invention relates to a method and a device for developing an electrostatic latent image produced on a surface of a movable intermediate carrier by electrically-charged dielectric color particles which are transported through a gap between the surface of the intermediate carrier and a surface of a developing device.

Such a method and the corresponding device have become known heretofore, for example, from xerography and are used for developing in laser printers, copiers and so forth. In xerography, a photoconductor drum is electrically charged and exposed so as to produce on the photoconductor drum a latent charge pattern corresponding to the print-density distribution of the image to be printed or copied. The latent charge image is developed afterwards, the photoconductor drum being charged with toner, which is attracted by the charged image locations on the photoconductor drum, and remains adhered thereto. The photoconductor drum forms an intermediate carrier for the developed toner image, which is then transferred to a substrate such as paper and is fixed thereon.

The toner is supplied to the intermediate carrier from a developing device, which is, for example, a cylinder or a belt that moves past the intermediate carrier at a more or less small distance therefrom. A distinction is made between so-called "jumper development" and so-called "contact development", depending upon whether the toner jumps across the gap between the developing device and the intermediate carrier or whether the toner is transferred by contact with the intermediate carrier.

An example of "jumper development" is offered in U.S. Pat. No. 3,997,688. In the technology described therein, as summarized in the preambles of claims 1 and 7, the toner is formed of dielectric pigmented particles having a diameter between 5 and 20 μm. The developing device is a belt which revolves around a plurality of cylinders and passes the intermediate carrier, namely, a photoconductor drum, at a spaced distance which is greater by a multiple than the diameter of the toner particles. The toner particles, which adhere in a layer on the belt due to frictional electricity, jump across the gap between the belt and the photoconductor drum, under the action or effect of an electric field, non-electrically charged locations of the electrostatic charge pattern remaining color-free. On the side of the belt, the electric field emanates from an electrode having a pointed edge, around which the belt is guided. A non-uniform field thereby arises which is most intense in the vicinity of the edge. Sufficient field strength to release the toner particles from the belt is thereby provided, without any occurrence of flashover between the belt and the photoconductor drum. The change in direction as the belt passes the edge furthermore increases the spaced distance between adjacent toner particles of the colored-particle layer in the gap and reduces the cohesion forces between the toner particles, so that less force is required in order to remove the individual toner particles from the layer.

Both for "jumper development" as well as for "contact development", the voltage differences between image regions and non-image regions of the electrostatic charge pattern must be relatively high in order to obtain a sufficiently high-contrast toner image. This is not a problem if the charge pattern is formed by the exposure of a photoconductor which has, in advance, been charged uniformly to a few hundred or a thousand volts, such as in a photocopier or a laser printer, for example.

In the printing technology arts, digital techniques have now become known wherein a charge pattern is formed by a multiplicity of charge generators which are disposed at pixel spaced intervals and are individually controlled in agreement with the image information to be printed. Such a process has become known, for example, from U.S. Pat. No. 4,792,860. As described therein, an intermediate carrier is provided with a surface on which a multiplicity of mutually insulated and individually chargeable microcells are disposed. The printing ink which is used is a thermoplastic two-component ink which is transferred in melted condition onto the intermediate carrier. Also in this case, relatively high voltages are required at the microcells if the printing ink is to be transferred with sufficient ink coverage. Therefore, the charge generators are formed by a special emitter array, which is capable of producing voltages of many hundreds of volts on the microcells. The expense associated therewith could be reduced if lower voltage differences were required in the charge image.

SUMMARY OF THE INVENTION

It is accordingly an object of the invention to provide a method and a device for developing an electrostatic latent image, which offers a development technique permitting an adequate and high-contrast transfer of printing ink onto an intermediate carrier having an electrostatic latent image with relatively low voltage differences between the various image regions.

With the foregoing and other objects in view, there is provided, in accordance with one aspect of the invention, a method of developing an electrostatic latent image produced on a surface of a movable intermediate carrier by electrically-charged dielectric color particles which are transported through a gap between the surface of the intermediate carrier and a surface of a developing device, which comprises loosely filling most of the gap with color particles, and successively producing, along the transport path of the color particles through the gap, the following voltage differences between the surface of the developing device and non-image regions on the surface of the intermediate carrier: a first voltage difference substantially equal to zero, so that the color particles are not electrostatically attracted or repelled, in substance, by the surface of the developing device and by the non-image regions, respectively; a second voltage difference providing an electric field between the surface of the developing device and the non-image regions, the color particles in the non-image regions being completely separated from the surface of the intermediate carrier by the electric field; and a third voltage difference smaller than the second voltage difference and providing an electric field between the surface of the developing device and the non-image regions, the color particles situated opposite the surface of the intermediate carrier in the non-image regions remaining spaced from the latter surface.

In accordance with another mode, the method according to the invention includes producing the various voltage differences by different voltages on the surface of the developing device, and keeping voltages in the non-image regions and voltages in image regions of the surface of the intermediate carrier constant.

In accordance with a further mode, the method according to the invention includes producing the various voltage differences by varying, in common, voltages in the non-image regions and voltages in image regions of the surface of the intermediate carrier, while keeping the surface of the developing device at a constant voltage.

In accordance with an added mode, the method according to the invention includes selecting the third voltage difference so that the color particles adjoining the non-image regions come no closer than a few tens of nanometers to the non-image regions.

In accordance with an additional mode, the method according to the invention includes selecting the color particles and the surface of the intermediate carrier of such characteristics that a force of adhesion and an image force on the color particles contacting the surface of the intermediate carrier are of a like order of magnitude.

In accordance with yet an added mode, the method according to the invention includes producing an electrostatic latent image on the surface of the intermediate carrier, the voltage difference between the image regions and the non-image regions being at most approximately 40 volts.

In accordance with another aspect of the invention, there is provided a device for developing an electrostatic latent image on a surface of a movable intermediate carrier, the device having a surface located opposite the surface of the movable intermediate carrier with a gap therebetween, comprising a device for transporting electrically charged dielectric color particles along a transport path through the gap, the device for transporting the color particles being arranged for loosely filling the gap, for the most part, with color particles, the transport path through the gap being formed of the following three successive regions wherein various voltage differences prevail between the surface of the developing device and non-image regions on the surface of the intermediate carrier: a first region with a first voltage difference substantially equal to zero, so that the color particles are not electrostatically attracted or repelled, in substance, by the surface of the developing device and by the non-image regions, respectively; a second region with a second voltage difference providing an electric field between the surface of the developing device and the non-image regions wherein the color particles are completely separated from the surface of the intermediate carrier; and a third region with a third voltage difference smaller than the second voltage difference and providing an electric field between the surface of the developing device and the non-image regions, the color particles located opposite the surface of the intermediate carrier in the non-image regions remaining spaced from the latter surface.

In accordance with another feature of the device of the invention, the color particles have a mean diameter of between a few μm and 20 μm, and wherein the gap between the surface of the movable intermediate carrier and the surface of the developing device is between 10 and 200 μm wide.

In accordance with a further feature of the device of the invention, the width of the gap is a multiple of the mean diameter of the color particles.

In accordance with an added feature of the device of the invention, the color particles and the surface of the intermediate carrier have such characteristics that an adhesion force and an image force on the color particles contacting the surface of the intermediate carrier are of a like order of magnitude.

In accordance with an additional feature of the device of the invention, the difference between a voltage on the non-image regions and the voltages on the image regions of the surface of the intermediate carrier is at most approximately 40 volts.

In accordance with yet another feature of the device of the invention, the third voltage difference has an AC voltage of a few kHz superimposed thereon.

In accordance with yet a further feature of the device of the invention, at least one of two phases exist, namely one phase wherein the color particles have a negative charge, and at least a voltage on the surface of the developing device in the second region and a voltage on the surface of the developing device in the third region are positive, and another phase wherein the color particles have a positive charge, and at least a voltage on the surface of the developing device in the second region and a voltage on the surface of the developing device in the third region are negative.

In accordance with yet an added feature of the device of the invention, the voltages on the image regions of the surface of the intermediate carrier are positive when the color particles are negatively charged and are negative when the color particles are positively charged, and a voltage on the surface of the developing device in the first region and a voltage on non-image regions of the surface of the intermediate carrier are at least approximately equal to zero.

In accordance with yet an additional feature of the device of the invention, the intermediate carrier is one of a rotating cylinder and a belt revolving around a cylinder, and has a surface formed with a multiplicity of individually chargeable microcells which are isolated or insulated from one another.

In accordance with still another feature of the device of the invention, the developing device includes either a fixed plate, a fixed cylinder, a rotating cylinder or a belt revolving around a cylinder, having a surface provided with a multiplicity of conducting elements extending transversely to the transport path of the color particles, a high or an infinitely high electrical resistance being present between adjacent ones of the conducting elements, and a device for producing voltages in the conducting elements being disposed in each of the various regions along the transport path of the color particles.

In accordance with a concomitant feature of the device of the invention, the devices for producing the voltages in the conducting elements are selected from the group thereof consisting of sliding-action contacts for contacting the conducting elements and capacitive and inductive devices for a contactless induction of voltages in the conducting elements.

According to the invention, the color particles are transported through the gap or nip between the surface of the intermediate carrier and a surface of a developing device in such a manner that they more-or-less fill the gap, no pressure, however, being exerted upon the color particles. The invention can, therefore, be understood to be an intermediate model between the "jumper development", wherein there is essentially empty space in the gap, and the "contact development", wherein the color particles are pressed against the intermediate carrier.

The invention creates a development technique which manages with relatively low voltage differences in the electrostatic latent image on the intermediate carrier, e.g., approximately 40 volts. Such voltages can be produced in a simple, reliable and economical manner by conventional electronics.

The invention permits a latent electrostatic image with these characteristics to be developed into a color image which permits adequate color coverage in image regions and has no background coloration whatsoever in non-image regions. The latter problem, that of the uncontrolled transfer of color particles to regions that should actually remain color-free, particularly affects the conventional techniques using "contact development". Furthermore, according to the invention, the intensity of the color coverage can be excellently controlled, so that a very fine and faithful reproduction of gray scales is possible.

According to the invention, an electric field is produced in the gap and varies in a defined manner along the transport path of the color particles. For this purpose, either a voltage on the surface of the developing device is varied along the transport path, or the voltages on the surface of the intermediate carrier are jointly changed along the transport path.

For a more detailed description, it is assumed that the color particles transported into the gap are negatively charged, e.g., by frictional electricity. Under this assumption, whenever reference is made hereinafter to voltages and charges, these are to be understood to be positive voltages and charges, unless otherwise indicated. For example, the image regions on the intermediate carrier are under a given (positive) voltage, depending upon the desired later gray scale in that area, in order to attract the negatively charged color particles thereto. If the color particles were positively charged, the aforementioned voltages would be negative. In the interest of simplicity, a voltage of zero volts is selected as the reference voltage, which is generally equivalent to ground potential. In a practical embodiment, this reference voltage may be shifted positively or negatively with respect to ground potential, which makes it necessary for the other voltages to be changed accordingly if all of the voltage differences are to be maintained.

Initially, the voltages are adjusted in a manner that the color particles pass a substantially field-free region in which they are able to be distributed across the width of the entire gap or nip. The only field from which a noteworthy effect emanates in this region is the field caused by charge islands on the surface of the intermediate carrier, i.e., by the image regions of the electrostatic charge image. These charge islands have charges which are opposed to the charge of the color particles, so that some of the color particles are attracted thereby. The remaining color particles may remain loosely distributed or may, through proximity forces, adhere to the surfaces of the intermediate carrier and the developing device, respectively, insofar as they come correspondingly close thereto.

In the aforementioned case wherein the voltage on the surface of the developing device is changed along the transport path, this voltage is next increased from zero or a value approximately zero to a value of several 100 volts. This voltage may be selected so that there is yet no flashover between the developing device and the intermediate carrier. This results in a field wherein the color particles in the non-image regions are released from the surface of the intermediate carrier, whereas the color particles in the charged image regions continue in part to adhere thereto. In order to ensure that all color particles in the non-image regions are removed from the surface of the intermediate carrier, it is necessary to overcome the proximity forces to which those color particles are exposed which continue to adhere to the surface of the intermediate carrier in the preceding, substantially field-free region.

These proximity forces are the Van der Waals forces, intermolecular forces with a maximum range of a few tens of nanometers, and the so-called image forces. The Van der Waals force on a particle in the vicinity of a surface is referred to hereinafter as the adhesion force. The image force is the force on a charged particle in the vicinity of a conducting surface, this force corresponding to the force of attraction of an oppositely charged particle which must be imagined in mirror-image manner on the other side of the surface. The image force is inversely proportional to the square of the distance of the center point of the particle from the surface and is, in the herein described technology, negligibly small if the distance is greater than the range of the adhesion forces. Consequently, the adhesion forces and the image forces are jointly referred to herein as proximity forces, with a range of a few tens of nanometers.

The applicant for the instant patent application has discovered that, on the whole, these proximity forces are smallest or are easiest to overcome if the characteristics of the color particles or of the surface of the intermediate carrier are such that the adhesion force and the image force on color particles contacting the surface of the intermediate carrier are of the same order of magnitude.

Moreover, the circumstance that the adhesion forces and the image forces are ideally of the same order of magnitude can be exploited not only within the framework of the invention of the instant application, but in any printing techniques wherein particles have to be removed from a surface.

After, the non-image regions have been completely freed of color particles in accordance with the technique of the invention, the aforementioned circumstance possibly having been taken into account or exploited, the color particles situated opposite the non-image regions are at some distance therefrom. This is due to the fact that the force driving the color particles in the electric field of the gap towards the surface of the developing device abruptly increases the instant the proximity forces cease to have an effect. In the image regions, the number of particles attracted to the image regions is reduced in favor of the number of particles attracted to the surface of the developing device.

According to the invention, in a third region of the gap or nip, the voltage on the surface of the developing device is again reduced, in fact, no more than to such an extent that the color particles remain at a distance of a few tens of nanometers from the surfaces of the intermediate carrier in the non-image regions, so that the proximity forces at the surface are just unable to take effect again. This ensures that individual color particles do not spontaneously move over to the non-image regions, and there is no background coloration in non-image regions.

Conversely, the cleavage level or plane of the color-particle layer in the image regions of the intermediate carrier is displaced in favor of color particles which are transferred to the image regions. Consequently, even with small voltage differences between the image regions and the non-image regions on the intermediate carrier, it is possible to achieve high-contrast color-particle transfer of the kind required for a printed product of offset quality. The force on the color particles adjacent to the non-image regions on the intermediate carriers has a hysteresis quality, as a combination of the proximity forces and the force of the electric field in the gap. This is exploited by the invention in order to manage with low voltage differences in the electrostatic latent image, for a given color coverage, without having to take into consideration any deterioration whatsoever of the background of the developed image.

An optimum reproduction of gray scales is obtained when using color particles with an average diameter of between a few μm and 20 μm and a gap or nip width between approximately 10 and 200 μm, the width of the gap being a multiple of the average diameter of the color particles. It is, however, also possible to make the gap or nip only slightly greater than the diameter Of the color particles with, for example, only one layer of color particles being transported into the gap. The reproduction of gray scales remains successful, among other things because, in practice, the color particles do not have a strict order and are of different sizes. Therefore, the cleavage level is to be viewed not as a sharply defined boundary, but rather as a region wherein, according to a Gaussian distribution, there are various probabilities that a single color particle will be drawn in one direction or the other. According to the invention, it is possible to obtain very low gray scales more easily and more uniformly than with the conventional "jumper development", because the threshold voltage is considerably lower.

In order to loosen the color particles and to improve the statistical distribution thereof, an AC voltage of a few kHz may be superimposed on the third voltage. If the third voltage is, for example, 100 volts, the amplitude of the superimposed AC voltage may be up to 200 volts, so that the third voltage is an AC voltage with peak values between 0 and 200 volts and with an r.m.s. voltage of 100 volts.

A rotating cylinder or a belt revolving around a cylinder may be used as the intermediate carrier. In the preferred embodiment, the surface of the intermediate carrier is provided with a multiplicity of microcells isolated or insulated from one another which are individually charged outside the region of the gap. Alternatively, the surface of the intermediate carrier may be a homogeneous dielectric layer whereon charge islands have been produced according to the desired printed image.

The developing device may include a fixed plate, a fixed or rotating cylinder or a belt revolving around a cylinder. There are various possibilities for transporting the color particles into the gap. For example, it is conceivable for the color particles to slide into the gap under gravity. Alternatively, use may be made of one of the many other transport techniques known from the developing art. For example, the color particles may adhere electrostatically to the intermediate carrier before the voltage on the intermediate carrier in the first region of the gap is brought to zero. Magnetic single-component developers likewise enter into consideration.

Should cylinders be employed as intermediate carriers and as developing devices, respectively, it may possibly be necessary, when specifying the voltages in the gap or nip, to take into consideration the surface curvature of the cylinders, which has an effect upon the field strength. A better overview is obtained of the conditions in the gap and, above all, the very long distance over which the color particles in the various regions in the gap are able to realign, if a belt, which extends over the length of the gap or nip parallel to and in synchronism with the cylinder or belt lying opposite thereto, is employed for the intermediate carrier and/or for the developing device.

In order to be able to change the voltage on the developing device along the transport path of the color particles, the surface thereof may have a multiplicity of conducting elements extending transversely to the transport path of the color particles, mutually adjacent conducting elements being more-or-less insulated from one another.

The conducting elements may have the required voltages applied thereto through the intermediary of sliding-action contacts, or they may be capacitively or inductively connected to generators which induce the corresponding voltages therein.

The conducting elements need not be completely insulated from one another. If the surface of the intermediate carrier between the conducting elements is not completely insulating, but rather, has a low conductivity, it is possible for the voltage to be smoothed or evened out, and there are no abrupt field changes when the conducting elements reach, for example, a sliding-action contact. Further entering into consideration as conducting elements are not only microscopic means, such as conductor strips, but also microscopic structures of the type existing in directionally conducting materials which conduct better in a preferred direction than transversely thereto. Other features which are considered as characteristic for the invention are set forth in the appended claims.

Although the invention is illustrated and described herein as embodied in a method and a device for developing an electrostatic latent image, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
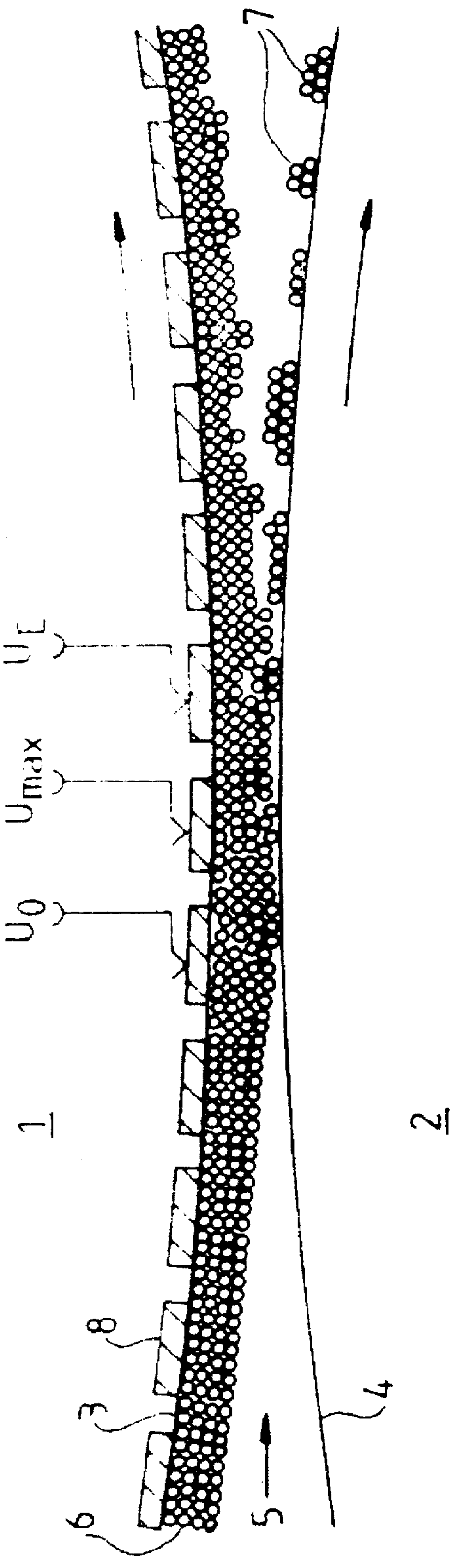
FIG. 1 is a fragmentary cross-sectional view of a developing cylinder and of a cylindrical intermediate carrier in the region of a nip therebetween.

Referring now to the drawings and, first, particularly to FIG. 1 thereof, there is shown therein a small section on the circumference of a developing cylinder 1 and of an intermediate carrier 2, which is likewise a cylinder. The developing cylinder 1 and the intermediate carrier 2 are mounted in a printing press at locations, respectively, above and below FIG. 1 of the drawing, and are driven so that they rotate in synchronism and at a defined differential speed, respectively, in the directions represented by the arrows at the right-hand side of FIG. 1. A surface 3 of the developing cylinder 1 and a surface 4 of the intermediate carrier 2 are situated opposite one another, with a nip 5 therebetween.

The developing cylinder 1 transports, on the surface thereof, for example, four layers of color particles 6 into the nip 5. The color particles 6 are, for example, negatively charged dielectric particles which adhere, for example, through electrostatic attraction, in a plurality of layers on the surface 3 of the developing cylinder 1. Only for simplification and clarity of the drawing, the color particles 6 are represented in a regular arrangement; in practice, they are more or less statistically distributed. Furthermore, the color particles 6 are shown exaggerated in size in comparison with the size of the cylinders.

The nip 5, at the narrowest location thereof between the developing cylinder 1 and the intermediate carrier 2, is of such width that the color particles 6 transported therein fill a major part of the nip 5 without being pressed together.

Situated on the surface 3 of the developing cylinder 1 is a multiplicity of rectilinear or straight conductor strips 8, each of which extends perpendicularly to the plane of the drawing figure and transversely over the entire length of the developing cylinder 1. The conductor strips 8 are distributed over the entire circumference of the developing cylinder 1 and are isolated from one another.

Disposed inside the developing cylinder 1 or at the sides thereof in the region of the nip 5 are, in succession, in the circumferential direction of the developing cylinder 1, three fixed sliding-action contacts, which consecutively contact each of the conductor strips 8 when the developing cylinder 1 rotates. Through the intermediary of the sliding-action contacts, voltages $U_o$, $U_{max}$ and $U_E$ are applied successively to the conductor strips 8.

The surface 4 of the intermediate carrier 2 has a multiplicity of conducting microcells (not shown in FIG. 1), which are isolated or insulated from one another, as described in the hereinaforementioned U.S. Pat. No. 4,792,860. These microcells, the size of which is selected in accordance with the desired printing resolution, are selectively charged more-or-less intensely at a location (not visible in the figure) on the circumference of the intermediate carrier 2. The surface 4 of the intermediate carrier 2 thus carries an electrostatic charge pattern corresponding to the desired printed image. In the nip 5, color particles 6 are selectively transferred to the charge pattern, so that, behind the nip 5, color islands 7 of color particles 6 are found on the surface 4 of the intermediate carrier 2, the color islands 7 corresponding to the color areas of the image to be printed. At another location on the circumference of the intermediate carrier 2, this developed image is then transferred to paper and is fixed thereon.

Figure 2A:
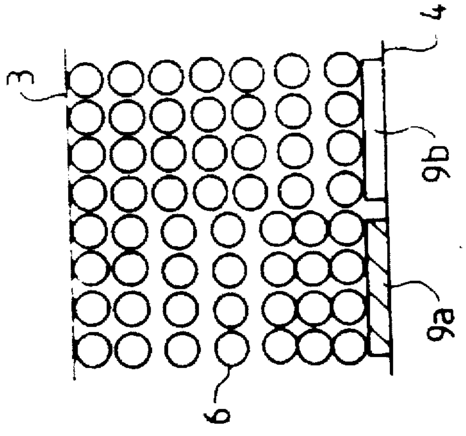
FIGS. 2*a*, 2*b* and 2*c* are enlarged fragmentary views of FIG. 1 depicting different phases of the development process in the nip between the cylinders.
Figure 2B:
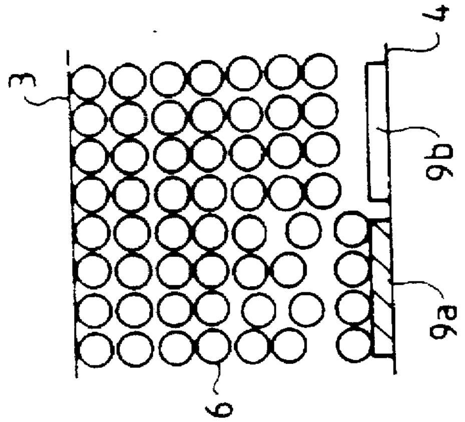
Figure 2C:
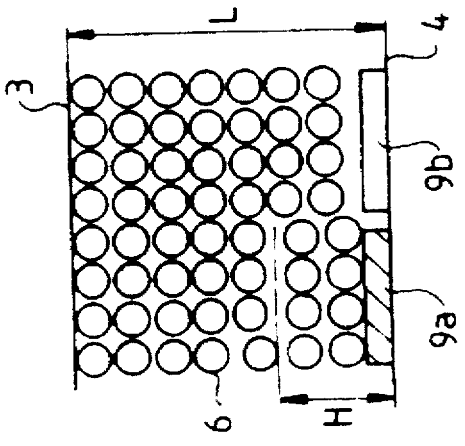

The manner of transferring color particles in the nip 5 is explained with further reference to FIGS. 2*a* to 2*c*, which show, in this sequence, the three regions in the nip 5 along the transport path of the color particles 6, wherein the voltages $U_o$, $U_{max}$ and $U_E$ are applied to the surface 3 of the intermediate carrier 1.

FIGS. 2*a* to 2*c*, respectively, show two microcells 9*a* and 9*b* on the surface 4 of the intermediate carrier 2, the microcell 9*a* having a voltage $U_1$ and the microcell 9*b* having a voltage $U_{1min}$. The voltage $U_{1min}$ is, for example, equal to zero and the voltage $U_1$ is greater than $U_{1min}$, e.g., equal to 40 volts. The microcell 9*a* forms an image region wherein maximum color saturation is desired, and the microcell 9*b* forms a non-image region onto which no color particles are to be transferred.

In FIG. 2*a*, the voltage $U_o$ on the surface 3 of the developing cylinder 1 is equal to zero or approximately equal to zero, so that the color particles 6 in the nip 5 are not exposed to any generally acting force. Some of the color particles 6, however, are attracted to the charged microcell 9*a*, and some color particles adhere, through proximity forces alone, to the microcell 9*b* and to the surface 3 of the developing cylinder 1.

In FIG. 2*b*, the voltage at the surface 3 of the developing cylinder 1 is a positive voltage $U_{max}$ which, at some hundreds of volts, is considerably greater than the voltage $U_1$ of the microcell 9*a* and generally attracts the color particles 6 to the surface 3 of the developing cylinder 1. The voltage $U_{max}$ is selected so that the color particles 6 are completely separated from the microcell 9*b*, even if they temporarily remained adhered thereto. The proximity forces on color particles 6, which adhere to the microcell 9*b*, must therefore be overcome. A part of the color particles 6 which, in FIG. 2*a*, were attracted by the microcell 9*a*, have been drawn towards the surface 3 of the developing cylinder 1, in FIG. 2*b*.

In FIG. 2*c*, the voltage $U_{max}$ is reduced to a voltage $U_E$, which is smaller than $U_{max}$ and greater than or equal to $U_1$. The voltage $U_E$ is selected so that the color particles 6 directly above the microcell 9*b* just fail to contact the latter, and more specifically, so that the proximity forces from the microcell 9*b* are not able to attract color particles 6 to the microcell 9*b*. The reduction in the voltage at the surface 3 to $U_E$ is accompanied by more color particles 6 being attracted to the microcell 9*a*, namely, two layers of color particles in FIG. 2*c*.

Under these conditions, the surfaces 3 and 4 then separate or part from one another as the developing cylinder 1 and the intermediate carrier 2 continue to rotate. In this regard, the color-particle layer above the microcell 9*a* cleaves at a height H above the microcell 9*a*. If the width or breadth of the nip 5 is equal to L, the height H, approximately, is obtained by considering a particle 6 situated in an equilibrium of forces between the surfaces 3 and 4. For such a particle 6, the following applies:

$$U_1/H=U_E/(L-H)$$

In the case wherein, for example, $U_1$=40 volts and $U_E$=100 volts, H=2L/7 is obtained, in accordance with FIG. 2*c*. In the case wherein $U_1=U_E$, H=L/2 would be obtained. As can be seen in FIG. 2*c*, the thickness of the transferred color-particle layer is considerably greater than the thickness of the color-particle layer which is held fast or trapped by the microcell 9*a* in the phase shown in FIG. 2*b*. The cleavage plane or level in the color-particle layer is displaced in favor of transferred color particles in the image regions, but not in favor of the transfer of color particles in the non-image regions. Consequently, due to the reduction in the voltage on the surface 3 of the developing cylinder 1, it is sufficient to have very small voltage differences, producible by conventional electronics, between the microcells 9*a* and 9*b* in order to attain color saturation in image regions and a color-free background in non-image regions.

Furthermore, the last voltage $U_E$ ensures that the non-transferred color particles 6 remain adhered to the surface 3 of the developing cylinder 1 and are transported out of the nip 5. The voltage $U_E$ may be maintained or refreshed, respectively, during the further rotation of the developing cylinder 1, so that the surface 3 is able to accept new color particles 6 and again transport them from the lefthand side, as shown in FIG. 1, into the gap 5.

Whereas the exemplary embodiment of the invention shown in FIG. 1 is based upon a cylindrical developing device and a cylindrical intermediate carrier, the developing device and/or the intermediate carrier may also have the form of an endless belt which, over a sufficiently long section, hugs the opposite cylinder or belt, with a gap or nip therebetween. This results in the following further embodiments:

The developing device is a belt, and the intermediate carrier is a cylinder.

The developing device is a cylinder, and the intermediate carrier is a belt.

The developing device is a belt, and the intermediate carrier is a belt.

Instead of varying the voltage on the developing device between $U_o$, $U_{max}$ and $U_E$, it is also alternatively possible to change the voltage on the opposing side. In this case, the voltages $U_1$ and $U_{1min}$ are changed together while retaining the voltage differences therebetween.

I claim:

1. A method of developing an electrostatic latent image produced on a surface of a movable intermediate carrier by electrically-charged dielectric color particles which are transported through a gap between the surface of the intermediate carrier and a surface of a developing device, which comprises loosely filling most of the gap with color particles, and successively producing, along the transport path of the color particles through the gap, the following voltage differences between the surface of the developing device and non-image regions on the surface of the intermediate carrier:

a first voltage difference substantially equal to zero, so that the color particles are not electrostatically attracted or repelled, in substance, by the surface of the developing device and by the non-image regions, respectively;

a second voltage difference providing an electric field between the surface of the developing device and the non-image regions, the color particles in the non-image regions being completely separated from the surface of the intermediate carrier by the electric field; and a third voltage difference smaller than the second voltage difference and providing an electric field between the surface of the developing device and the non-image regions, the color particles situated opposite the surface of the intermediate carrier in the non-image regions remaining spaced from the latter surface.

2. Method according to claim 1, producing the various voltage differences by different voltages on the surface of the developing device, and keeping voltages in the non-image regions and voltages in image regions of the surface of the intermediate carrier constant.

3. Method according to claim 1, which includes producing the various voltage differences by varying, in common, voltages in the non-image regions and voltages in image regions of the surface of the intermediate carrier, while keeping the surface of the developing device at a constant voltage.

4. Method according to claim 1, which includes selecting the third voltage difference so that the color particles adjoining the non-image regions come no closer than a few tens of nanometers to the non-image regions.

5. Method according to claim 1, which includes selecting the color particles and the surface of the intermediate carrier of such characteristics that the force of adhesion and the image force on the color particles contacting the surface of the intermediate carrier are of a like order of magnitude.

6. Method according to claim 1, which includes producing an electrostatic latent image on the surface of the intermediate carrier, the voltage difference between the image regions and the non-image regions being at most approximately 40 volts.

7. Device for developing an electrostatic latent image on a surface of a movable intermediate carrier, the device having a surface located opposite the surface of the movable intermediate carrier with a gap therebetween, comprising a device for transporting electrically charged dielectric color particles along a transport path through the gap, said device for transporting the color particles being arranged for loosely filling the gap, for the most part, with color particles, said transport path through the gap being formed of the following three successive regions wherein various voltage differences prevail between the surface of the developing device and non-image regions on the surface of the intermediate carrier:

a first region with a first voltage difference substantially equal to zero, so that the color particles are not electrostatically attracted or repelled, in substance, by the surface of the developing device and by the non-image regions, respectively;

a second region with a second voltage difference providing an electric field between the surface of the developing device and the non-image regions wherein the color particles are completely separated from the surface of the intermediate carrier; and a third region with a third voltage difference smaller than the second voltage difference and providing an electric field between the surface of the developing device and the non-image regions, the color particles located opposite the surface of the intermediate carrier in the non-image regions remaining spaced from the latter surface.

8. Developing device according to claim 7, wherein the color particles have a mean diameter of between a few μm and 20 μm, and wherein the gap between the surface of the movable intermediate carrier and the surface of the developing device is between 10 and 200 μm wide.

9. Developing device according to claim 8, wherein the width of the gap is a multiple of said mean diameter of the color particles.

10. Developing device according to claim 7, wherein the color particles and the surface of the intermediate carrier have such characteristics that an adhesion force and an image force on the color particles contacting the surface of the intermediate carrier are of a like order of magnitude.

11. Developing device according to claim 7, wherein the difference between a voltage on the non-image regions and the voltages on the image regions of the surface of the intermediate carrier is at most approximately 40 volts.

12. Developing device according to claim 7, wherein the third voltage difference has an AC voltage of a few kHz superimposed thereon.

13. Developing device according to claim 7, wherein at least one of two phases exist, namely one phase wherein the color particles have a negative charge, and at least a voltage on the surface of the developing device in the second region and a voltage on the surface of the developing device in the third region are positive, and another phase wherein the color particles have a positive charge, and at least a voltage on the surface of the developing device in the second region and a voltage on the surface of the developing device in the third region are negative.

14. Developing device according to claim 13, wherein the voltages on the image regions of the surface of the intermediate carrier are positive when the color particles are negatively charged and are negative when the color particles are positively charged, and a voltage on the surface of the developing device in the first region and a voltage on non-image regions of the surface of the intermediate carrier are at least approximately equal to zero.

15. Developing device according to claim 7, wherein the intermediate carrier is one of a rotating cylinder and a belt revolving around a cylinder, and has a surface formed with a multiplicity of individually chargeable microcells which are isolated from one another.

16. Developing device according to claim 7, including one of a fixed plate, a fixed cylinder, a rotating cylinder and a belt revolving around a cylinder, having a surface provided with a multiplicity of conducting elements extending transversely to said transport path of the color particles, one of a high and an infinitely high electrical resistance being present between adjacent ones of said conducting elements, and including a device for producing voltages in said conducting elements being disposed in each of the various regions along said transport path of the color particles.

17. Developing device according to claim 16, wherein said devices for producing said voltages in said conducting elements are selected from the group thereof consisting of sliding-action contacts for contacting said conducting elements and capacitive and inductive devices for a contactless induction of voltages in said conducting elements.

* * * * *